UNITED STATES PATENT OFFICE.

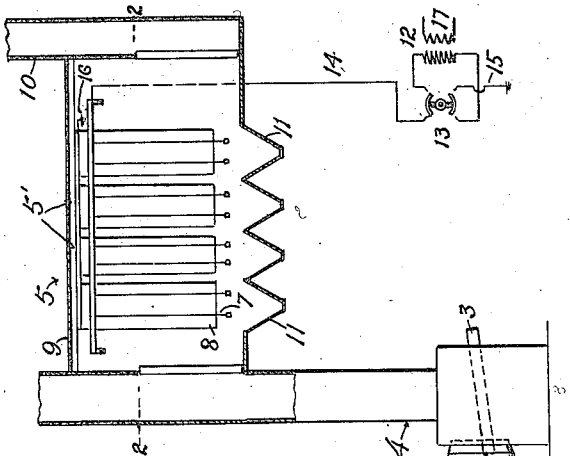
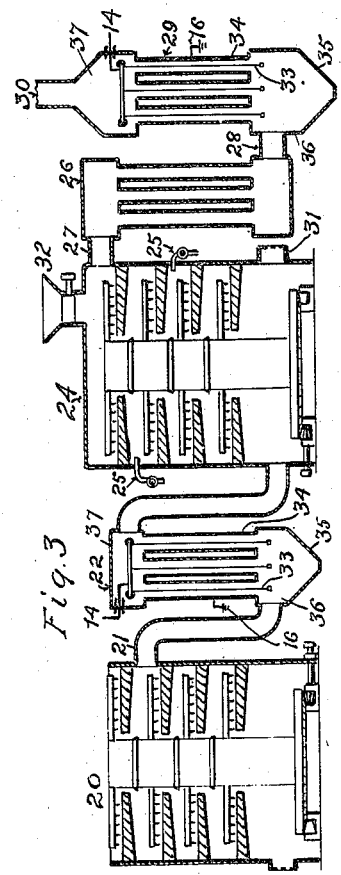
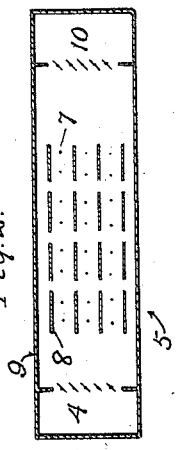
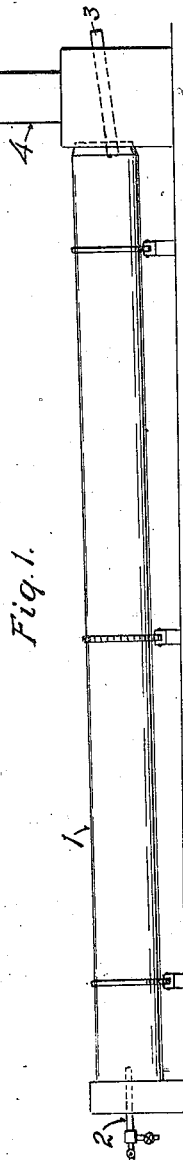

WALTER AUGUST SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS OF OBTAINING ALKALI-METAL COMPOUND FROM SILICATES.

1,200,887. Specification of Letters Patent. Patented Oct. 10, 1916.

Application filed February 18, 1915. Serial No. 9,066.

*To all whom it may concern:*

Be it known that I, WALTER AUGUST SCHMIDT, a citizen of the United States, residing at Los Angeles, in the county of Los Angeles and State of California, have invented a new and useful Process of Obtaining Alkali-Metal Compounds from Silicates, of which the following is a specification.

When potash-bearing mineral silicates such as feldspar and similar materials are subjected to the action of heat under suitable conditions, and in the presence of lime or equivalent alkaline earth, some of the potash is liberated in the form of a volatile compound, which passes off and may be recovered by suitable means. I have found that under some conditions the presence of sulfur dioxid and oxygen in contact with the material or with the volatile potassium compound, is of advantage in increasing the amount of potash obtained from the mineral. The collection or recovery of the potassium compound when driven off in this manner, is a matter of some difficulty. The potassium compound is liberated from the mineral at a high temperature and condenses to solid state at a temperature which is considerably above any temperature that can be sustained by bag filters. The fume produced by the condensed particles of potassium compound is so fine that its complete recovery in settling chambers is out of the question. Moreover, under conditions of practice the gases carrying the potassium compound, either as vapor or suspended matter, also, in general, contain a considerable amount of other material in the form of dust or fume which constitutes an impurity when collected with the potassium compound.

An important object of my process is to provide for effective separation of the potassium compound from such impurities.

Another object of my invention is to provide a process whereby the fumes containing potassium compound can be precipitated under more fully regulated conditions of temperature than is possible with mechanical precipitation methods, so as to provide for effective parting of the potassium compound from other materials present in the gases.

Another object of the invention is to enable the potassium compound to be precipitated at a temperature which does not require undue cooling of the gases containing the same. In order to maintain the draft and to avoid the expense of cooling the gases to a relatively low temperature, it is desirable to precipitate the potassium compound at a temperature as little as possible below the temperature of condensation thereof, and my process provides for such precipitation at a relatively high temperature.

My invention is particularly applicable in connection with cement manufacture, the method of precipitation used by me being especially adapted to treat the great volumes of stack gases, carrying extremely fine fumes, which are produced in such manufacture, in such manner as to recover a large proportion of the potash content of the materials used, with a minimum of expense and without any incidental expense for cooling the gases.

The accompanying drawings illustrate apparatus suitable for carrying out my process and referring thereto:

Figure 1 is an elevation, partly in section, of an apparatus suitable for carrying out my invention in connection with the production of cement, the potash being in that case a by-product of such production. Fig. 2 is a section on line 2—2 in Fig. 1. Fig. 3 is a vertical section of a form of apparatus suitable for applying my process to the recovery of potash as a main product.

Referring to Fig. 1, the apparatus therein shown comprises a kiln 1 for heating the mixture of materials containing the constituent to be separated, said kiln being shown as a cement kiln for burning cement mixture to form clinker. This kiln is heated by a burner 2, which, in this embodiment of the invention is adapted to furnish not only the heat required for burning the cement, but also to furnish a supply of $SO_2$ for reaction, according to my process, with a constituent of the material in the kiln, said burner being for example an oil burner adapted to burn fuel oil containing a considerable proportion of sulfur. An outlet flue 4 leads from the kiln 1 to a treater or electrical precipitator, 5, comprising a plurality of sections or sets, 5', through which the gas from the kiln passes successively, so as to be subjected to progressive cooling action therein, said treater section comprising a series of sets of discharge electrodes 7 and collecting electrodes 8 arranged within a casing 9, adapted to conduct the gas from the flue 4 successively between the sets of electrodes and to discharge the gas through a flue 10. Separate receptacles or bins 11 are provided for receiving the precipitates from the respective sets of electrodes. Means are provided for applying unidirectional current of high potential difference to said electrodes, comprising, for example, a step-up transformer 12 having its primary winding connected to an alternating current supply circuit 17, and having its secondary winding connected through a rectifier 13 to the discharge electrodes 7 of the treater, by wire 14, and to ground by wire 15; the collecting electrodes 8 being also grounded, as at 16. The discharge electrodes 7, may be wires, and the collecting electrodes 8 may be plates or screens.

My invention is carried out in this apparatus as follows: The cement mixture used comprises a lime aggregate and a clay aggregate, containing more or less potash, (for example, as a feldspar constitutent); said aggregates being ground and mixed together in the usual manner. Such cement mixture is supplied to the kiln 1, through supply means 3, and in passing through the kiln, is heated by the action of burner 2, so as to form cement clinker. In carrying out my process I have used a fuel oil containing a considerable percentage of $SO_2$. The gases passing from the burner passing in contact with the highly heated potassium bearing material in the mixture, react therewith to form a compound (potassium sulfite, or sulfate) which is volatile at the temperature of the gases in the kiln and is therefore volatilized and carried off by the current of gas through the kiln.

The gases passing from the kiln through the outlet 4 contain a considerable quantity of dust or finely divided solid matter suspended therein, as well as the vapor of such potassium compound. As the gases are cooled by radiation and conduction of heat therefrom, through the walls of the apparatus, the potassium compound is condensed from the form of vapor to the form of a cloud of particles, such particles being suspended in the gas and passing along with the other suspended matter in the gas, through the precipitator 5. As the gases pass through the precipitator the action of the electrical discharge between the electrodes thereof causes precipitation of the suspended matter, and in this operation the coarser particles are first precipitated, and the finer particles, consisting largely of the potassium compound are precipitated more slowly, so that such compound tends to collect in the later bins of the series. The material collected in the bins or receptacles, 11, is then comparatively poor in potash in the bins nearer the kiln and the potash content increases progressively in the bins more remote from the kiln, so that in certain of the bins, for example, the last bins of the series, the dust contains sufficient potash to give it commercial value as a fertilizer, or for other purposes.

In carrying out my process as above described, I have used a clay aggregate containing about 20 per cent. of feldspar, the potash of the feldspar constituting about .72 per cent. of such clay aggregate. The fuel oil used in the process contained about 1.2 per cent. sulfur. The potash content in the bins was about 1 per cent. in the first bins of the series and about 3 per cent. in the last bins of the series, and averaged about 2 per cent.

The dust collected in the several bins may be removed, and in case it contains sufficient potash to render it commercially valuable, as, for example, in the case of the later bins of the series, it may be sold as fertilizer or for other purposes, or the potassium compound may be leached from said dust with water. Any of the dust which is not sufficiently rich in potash to make it commercially valuable for its potash content may be returned to the kiln along with additional raw mix to form part of the cement mixture. Moreover, any desired part of the dust so collected may be concentrated to a condition of greater richness in potash; for example, by passing such dust through the kiln 1, or a similar kiln, so that the same operation takes place on the dust as above described for the cement mixture, with the result that potassium compound in the dust so supplied to the kiln is volatilized by the heat of the kiln, and the other constituents of such dust, being relatively non-volatile, are carried over to the treater in less proportion than such potassium compound, so that on condensation of such compound by cooling in the treater, and precipitating the condensed particles by electrical action in the treater there is collected in the treater bins a material which is comparatively rich in potash. By this means I have been able, using the cement constituents above described and subjecting the dust precipitated in the treater to a concentrating action as set forth, to produce a material containing as much as 20 per cent. of potash, calculated as $K_2O$.

In carrying out my process as above described, the potash is recovered as a by-product of cement manufacture, and the precipitation is more especially for removal of the solid matter in the flue gases to avoid discharge thereof into the atmosphere. But effective separation of the potash is secured, as above indicated, resulting in a potash product of commercial value.

In applying the process to the recovery of potash as a main product, I may also use the apparatus shown in Fig. 1, or I may use the apparatus shown in Fig. 3, comprising a roaster or furnace 20, adapted to roast pyrites, for example, to produce gases containing $SO_2$; said gases passing off through outlet pipe 21. A furnace or heater 24 is connected to receive such gases, and is adapted to bring such gases, while at a suitable temperature, into contact with the potash bearing mineral. Said furnace or heater 24 may be provided with burner means 25 for maintaining the same at the proper temperature and may have means 31 for admission of air and means 32 for supply of mineral thereto. An electrical precipitator 22 is provided for precipitating the dust or suspended solid matter coming from the roaster 20, said precipitator being located at any suitable point in the apparatus, for example, as shown between the roaster 20 and the heater 24; or it may be connected to the outlet of the said heater. The gas passing from said heater, and from which the suspended matter has been removed by the action of said precipitator, is led by piping 27, 28, through a cooler 26, to an electrical precipitator 29, which discharges the gas through a stack 30. Each of the electrical precipitators 22 and 29 may be of any suitable type, for example, of the type shown, comprising discharge electrodes 33 formed as fine wires, hung axially in vertical pipes 34, acting as collecting electrodes, bins 35 being provided below said vertical pipes for receiving the precipitated material, and headers 36 and 37 being provided at the lower and upper ends of said pipes for conducting the gases to and from the same. The discharge electrodes 33 are connected to the high tension side 14, of a uni-directional high tension current circuit and the collecting electrodes 34 are grounded as at 16.

My process may be carried out in the above described apparatus as follows: The gases containing sulfur dioxide are drawn from the roaster 20, by the action of natural or forced draft, and caused to pass through the heater 24, and the potash bearing mineral, such as feldspar, finely ground and mixed with lime is also supplied to said heater so as to be exposed to contact with such gases, the heater being maintained at a suitable temperature, for example, about 1000 degrees C., and air being admitted if necessary, so that the potash in the compound is acted upon to form a compound which is volatile at the temperature of the heater and is therefore driven off from the mineral and passes off with the current of gas. Any dust or suspended matter carried over from the roaster 20 is removed from the gas by the action of precipitator 22, either before or after the gas has passed through the heater 24. If desired, an additional precipitator may be interposed between the heater 24 and the cooler 26, to receive any solid matter carried over from the heater. The gases then pass through the cooler 26, wherein their temperature is reduced sufficiently to fully condense the potassium compound, forming a cloud of particles suspended in the gas, and this suspended material containing the potassium compound is then precipitated in the precipitator 29.

The furnace 20, instead of being a furnace or roaster for production of sulfur dioxid, may be a smelting or other furnace in which sulfur dioxid is formed as a waste product, and in such case the main object of the invention may be the elimination of the sulfur dioxid from the waste gases of such a furnace. In such case the process may be carried out as above described, except that the produced compound containing potassium sulfite or sulfate or both, may be discharged as a waste product, with or without precipitation.

I have described my process as applied to utilization of potassium in minerals such as feldspar. My invention is however applicable to any mineral containing an alkali capable of reacting with sulfur dioxide in the manner described. Moreover, in place of lime as a reagent, I may use any base capable of acting in the same manner in the stated reaction. I have found electrical precipitation to be the most effective method of removing the suspended material from the gases, as it enables the fumes to be collected at temperatures not materially below ordinary stack temperatures, and at moderate expense for construction and operation of plant, notwithstanding the extreme fineness of the fumes and the great volumes of gas involved. The action of the sulfur dioxid and oxygen contained in the gases is of value in increasing the amount of potassium compound, under the conditions above set forth, either by facilitating the formation of a volatile compound from the feldspar, or by facilitating the condensation of the already volatilized potassium compound, according to the conditions under which the process is carried out.

What I claim is:

1. The process of recovering potassium compound from feldspar and similar minerals, which consists in subjecting the same to heat in the presence of an alkaline earth and of hot gases in such manner as to volatilize potassium compound from said mineral, drawing off such hot gases containing such potassium compound, causing such potassium compound to condense to form suspended particles in the gases, and subjecting the gases to the action of an electric field to precipitate the suspended particles of potassium compound from the gases.

2. The process of recovering potassium compound from feldspar and similar minerals, which consists in subjecting the same to heat in the presence of an alkaline earth and hot gases, in such manner as to volatilize and remove potassium compound from such mineral, drawing off such hot gases containing such potassium compound, causing such potassium compound to condense to form suspended particles in the gases, and subjecting the gases while still at a high temperature to the action of an electrical field to precipitate the suspended particles of potassium compound from the gases.

3. The process of removing potassium compound from feldspar and similar minerals, which consists in subjecting the same to high temperature in the presence of an alkaline earth and of hot gases, containing sulfur dioxid in such manner as to volatilize and remove potassium compound from said mineral, drawing off such hot gases containing such potassium compound, condensing the potassium compound to form suspended particles in the gases, and subjecting the gases to the action of an electrical field to precipitate such suspended particles therefrom.

4. The process of treating mineral silicates containing potassium for recovery of potassium compound therefrom, which consists in passing, in contact with such silicates and in the presence of lime, hot gases containing sulfur dioxid, in such manner as to volatilize and carry off potassium compound from said mineral silicates, causing said gases to cool so as to condense the potassium compound, and subjecting the gases to the action of an electrical field to precipitate the condensed potassium compound therefrom.

5. The process of treating mineral silicates containing potassium for recovery of potassium therefrom, which consists in passing, in contact with such mineral silicates, gases heated to a sufficient temperature to volatilize and carry off potassium compound from such mineral silicates, and subjecting the gases to a plurality of successive precipitating actions in electrical fields to first precipitate from the gases dust and other impurities carried over with the gases and to then precipitate portions of potassium compound.

6. The process of treating mineral silicates containing potassium, which consists in passing, in contact with such mineral silicates, together with lime, gases at sufficient temperature and at sufficient velocity to carry off potassium compound in the form of vapor together with the finely divided mineral matter suspended in said gases, progressively cooling the gases to a temperature sufficient to condense such potassium compound, and subjecting the gases while being progressively cooled to the successive action of a plurality of electrical fields to precipitate successively the finely divided mineral matter carried over by the gases and successive portions of the condensed potassium compound.

7. The process of treating a mineral silicate containing potassium, which consists in passing, in contact with such mineral silicates together with lime, hot gases containing sulfur dioxid, said gases being at sufficiently high temperature to volatilize potassium compound from the mineral silicate, withdrawing the gases with the potassium compound and finely divided mineral matter taken up from said mineral silicates and suspended in said gases, and subjecting the gases to a plurality of successive precipitating actions in electrical fields to precipitate successively the said finely divided mineral matter and the condensed potassium compound.

8. The process of treating mineral silicates containing potassium for recovery of potassium compound therefrom, which consists in mixing said silicates with lime, passing hot gases in contact with the said mineral silicate and lime, said gases being at sufficient temperature to cause volatilization of potassium compound, drawing off the gases from the mineral silicate together with the volatilized potassium compound and finely divided mineral matter taken up by the gases, and subjecting the gases to a plurality of precipitating actions to separate portions relatively rich in potassium compound from portions relatively poor in potassium compound.

9. The process of treating mineral silicates containing potassium for recovery of potassium compound therefrom, which consists in mixing said silicates with lime, passing hot gases in contact with the said mineral silicate and lime, said gases being at sufficient temperature to cause volatilization of potassium compound, drawing off the gases from the mineral silicate together with the volatilized potassium compound and finely divided mineral matter taken up by the gases, and subjecting the gases to a plurality of percipitating actions to separate portions relatively rich in potassium compound from portions relatively poor in potassium compound, subjecting said portions relatively rich in potassium compound, to the action of heat to volatilize potassium compound therefrom, and precipitating the potassium compound so volatilized.

10. The process of recovering alkali metal compounds from mineral silicates, which consists in subjecting the silicates to heat in the presence of an alkaline earth and of hot gases, in such manner as to volatilize alkali metal compound from such silicate, drawing off the hot gases containing such alkali metal compound, causing such alkali metal compound to condense to form suspended particles in the gases, and subjecting the gases to the action of an electric field to precipitate the suspended particles of alkali metal compound from the gases.

11. The process of treating mineral silicates containing alkali metal, which consists in subjecting such silicates to heat in the presence of an alkaline earth and of hot gases, in such manner as to volatilize alkali metal compound from the silicate, drawing off the hot gases containing such alkali metal compound, causing such alkali metal compound to condense to form suspended particles in said gases, and subjecting the gases to a plurality of successive precipitating actions in electrical fields to separate portions relatively rich in alkali metal compound from portions relatively poor in alkali metal compound.

In testimony whereof I have hereunto set my hand, at Los Angeles, California, this 6th day of February 1915.

WALTER AUGUST SCHMIDT.

Witnesses:
 A. P. KNIGHT,
 WM N. DREW.